May 16, 1950     H. F. WAARDS     2,508,128

METHOD OF PRODUCING COMPOSITE PLATES OR SHEETS

Filed July 9, 1946

Inventor:
Hendrikus F. Waards
by Walter S. Bleston
ATTORNEY

Patented May 16, 1950

2,508,128

UNITED STATES PATENT OFFICE 2,508,128

METHOD OF PRODUCING COMPOSITE PLATES OR SHEETS

Hendrikus F. Waards, Amsterdam, Netherlands, assignor to Superflex Plywood Corporation, New York, N. Y., a corporation of New York Application July 9, 1946, Serial No. 682,203
In the Netherlands March 2, 1943

Section 1, Public Law 690, August 8, 1946
Patent expires March 2, 1963

8 Claims. (Cl. 154—125)

The present invention relates to methods of producing composite plates or sheets.

It is an object of the invention to provide a method of forming composite sheet materials or plates which are capable of use for various purposes, for instance for doors, the walls of rotary doors, furniture, wainscoting, walls of display windows, seating surfaces, the casing of radio receivers, light reflectors and the like.

It has previously been proposed to make up composite plates, which may, if required, be bent, by assembling a number of wooden laths parallel to each other and glueing thereto, on one or both sides, a connecting layer e. g. of veneer, wood, cardboard, artificial leather, canvas, thin sheet metal or like material. This process is costly and involves much loss of time.

A further object of the invention is to provide methods of producing composite sheets of the above character, which methods are comparatively simple, speedy and inexpensive.

Thus, the invention comprises a method of producing composite plate or sheet material comprising a plurality of parallel or substantially parallel laths or strips of wood or other rigid material secured at one side to a connecting layer of veneer, cardboard, canvas, thin sheet metal or the like, characterised in that incisions, e. g. a plurality of parallel incisions, are formed in a plate, sheet or board from one surface thereof, a connecting layer is attached to this surface of the plate, sheet or board in which the incisions are made, and thereafter material is removed from the opposite surface of the plate, sheet or board so as to expose the incisions to the exterior. The attachment of the connecting layer may, in many cases, be obtained by glueing.

When flexible plates or sheets are to be made, the product obtained is ready for use. When non-flexible plates or sheets are to be made, a second connecting layer is applied to the said opposite surface, if necessary after having brought the plate into a bent or curved form.

If straight or flat plates are to be made, no material, or only a small amount of material, is removed from the surface opposite to that in which the incisions are made.

The invention extends further to the method wherein the plate, sheet or board in which the incisions are made has its thickness so selected that it can be used for making additional composite plates or sheets. The process is then as follows: After having provided this relatively thick plate, sheet or board with incisions, a connecting layer is applied to the surface in which the incisions are made, whereupon the laminate obtained is separated in two parts by means of a saw-cut parallel or substantially parallel to the connecting layer, one of which parts is a composite plate or sheet as described, and the other is again a plate or board provided with incisions, which can be dealt with again in the manner described.

The method according to the invention may also be carried out in such a manner that, after the first connecting layer is applied, a layer of material extending up to the incisions is removed from the opposite surface, whereupon a connecting layer is applied to the newly formed surface and then the laths or strips between both layers are severed by a saw-cut parallel to the layers so that two composite plates are obtained. If desired, this process can be separated one or more times.

Another mode of carrying the invention into practice is to provide the plate, sheet or board on both sides with incisions but at the same time leaving some material between the ends of the incisions, or the incisions can be made so deep, that the ends of those from the one side of the plate or the like overlap the incisions from the other side. The incisions from one side of the plate must then enter between two adjacent incisions from the other side of the plate. In this case one single saw-cut parallel to the reinforcing layers will form two composite plates or sheets when a connecting layer has been applied on both sides of the plate or sheet.

When using the invention, a considerable simplification of manufacture is obtained, especially when flexible plates or sheets are being made. The correct assembling of a number of laths and their attachment to the connecting layer according to the known process, which took much time, is obviated by the method of the present invention. A process might be followed wherein the plate or sheet and the connecting layer are glued together and thereupon incisions are made in the non-glued surface. In this case it is, however, difficult to make the incisions exactly of the right depth. It will be appreciated that when they are too deep and exceed the thickness of the plate or sheet, the connecting layer is damaged whereas, when the incisions are of less depth than the thickness of the plate or sheet, the flexibility of the composite plate or sheet obtained is affected.

The incisions are preferably obtained by sawing. The removal of the material of the plate or sheet extending up to the ends of the saw-cuts, may be obtained by sawing, planing and preferably by milling.

This removal can, according to a further feature of the invention also be achieved by making incisions in the surface of the plate, sheet or board opposite to that in which originally incisions have been made, which secondary incisions are made in the plane of the original incisions and extend up to the ends of these original incisions. This mode of removing a part of the material has the result that material is saved.

Another mode of carrying the invention into practice is to treat the surface of the plate, sheet or board to which the connecting layer is to be attached, after the incisions have been made, in such a manner that each strip or portion between the incisions is provided with a narrow ridge or rib extending parallel to the incisions, the width of the ridge or rib being for instance 2 to 5 centimetres. In this case the connecting layer will be attached to the upper surfaces of the ridges or ribs.

The result of this arrangement is that the outer surface of the connecting sheet of the composite plate or sheet forms, when this plate or sheet is bent, a smooth continuous curve without the straight portions which occur when the portions of the plate or sheet between the incisions are broader. A further advantage of this construction is that the strips or portions between the incisions can be made broader because these broader portions are not attached to the connecting layer, but only a narrow ridge or rib which does not interfere with the smooth continuous curve of the plate or sheet. The broader strips are advantageous for receiving screws, nails and the like. Besides this, the channels which are thereby formed laterally of the narrow ridges or ribs can serve as ventilation channels.

A further mode of carrying the invention into practice is to make the parallel or substantially parallel incisions so deep that they extend throughout the thickness of the plate, thus piercing the board or plate entirely however taking care to spare one, two or more strips or dams which keep the board or plate in its original form. Said strips or dams may be spared in the original thickness of the board, but they may also be provided with incisions which however do not pierce the entire thickness of the board. When the board or plate has been treated in this manner a connecting layer is connected to one or to both sides of the board. In case a straight composite plate is to be formed connecting layers are attached to both sides of the board. When a bent plate is to be made then a connecting layer is attached to one side of the plate, thereupon the strips or dams are removed by providing the strips or dams with incisions preferably in the line of the original incisions and which pierce the board entirely, dividing thereby the board into separate laths which are held in position by the connecting layer or the strips or dams can be cut away. The plate can then be bent and eventually provided with a second connecting layer. The advantage of this arrangement is that the incisions can be made in one single working process and that when straight plates are to be formed, both layers can be attached simultaneously.

When the connecting layer and the plate, sheet or board are both of a material with substantially parallel fibres, as is the case with veneer and an ordinary wooden board, the incisions are preferably arranged parallel to the direction of the fibres of the plate or sheet whilst the connecting layer is arranged in such a manner that the fibres thereof extend in a direction transverse to that of the fibres of the connecting layer.

As the composite plates or sheets according to the invention are very flexible they can readily be used for splinting broken limbs. In this case the composite plate is bent around the broken limb and secured thereto.

Figure 1:
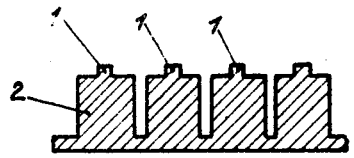
Fig. 1 is a cross section through a part of a plate or board provided with incisions in accordance with the first step of the method of this invention. It will also be observed that the laths or portions between the incisions have, at their free ends, narrow ridges or ribs.

In the example illustrated in Fig. 1 the narrow ridges 1 are formed by cutting away a part of the laths 2 so as to provide ridges of rectangular form in cross-section.

Figure 2:
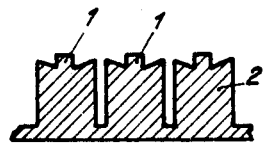
Figs. 2 and 3 are cross sections similar to that of Fig. 1 but illustrating ridges of different shapes.
Figure 3:
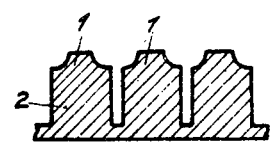

In Figs. 2 and 3 the surface portions of the laths adjacent the ridges are of modified appearance, being formed at inclined angles in one case and curved in the other.

Figure 4:
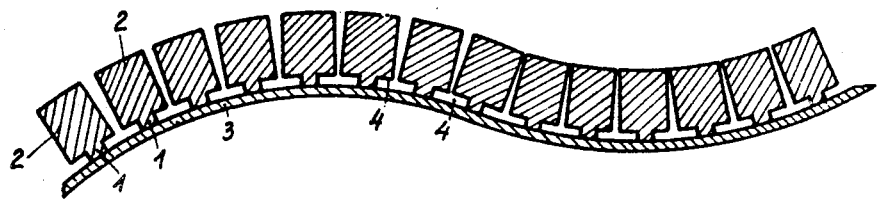
Fig. 4 is a cross section through a part of one form of curved composite plate provided by the invention.

Fig. 4 is a cross section through a bent plate, and it will be noted that the connecting layer 3 has a smooth continuous curve. The ventilation channels are indicated by the reference numeral 4.

Figure 5:
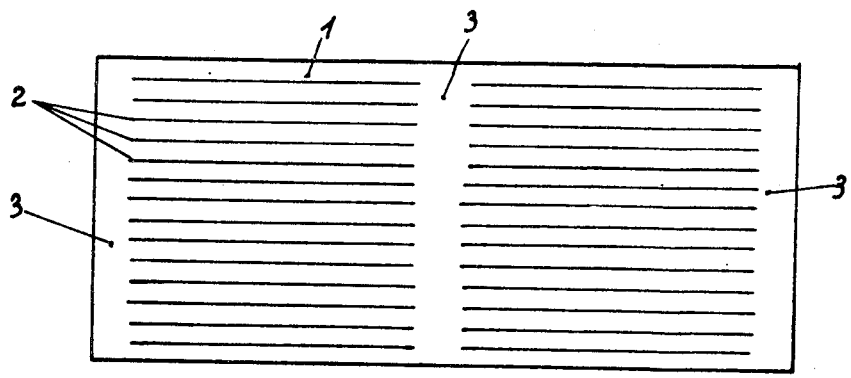
Fig. 5 is a plan view of a board provided with insertions piercing the whole thickness of the board, showing the strips or dams which keep the board in its original shape.

The figure 5 shows a board or plate provided with incisions 2 which pierce the board 1 entirely however leaving strips or dams 3 keeping the board in its original form.

What I claim is:

1. A method of producing composite panels comprising the steps of providing a board with a plurality of substantially parallel incisions so as to leave connecting board material between the material intermediate each pair of adjacent incisions and the material intermediate other pairs of adjacent incisions, bonding a layer of flexible material to one surface of said board where said incisions are provided, and removing said connecting material so as to form slightly spaced parallel laths bonded to said flexible layer.

2. A method of producing composite panels comprising the steps of providing one surface of a board with a plurality of incisions of a depth somewhat less than the thickness of the board, bonding a layer of flexible material to said surface so incised, and removing a layer of board material on the side opposite said surface so as to expose said incisions.

3. A method of producing composite panels comprising the steps of providing a board with a plurality of substantially parallel incisions so as to leave connecting board material between the material intermediate each pair of adjacent incisions and the material intermediate other pairs of adjacent incisions, providing the material on the one board surface intermediate each pair of adjacent incisions with recesses parallel to said incisions so as to form a rib-like projection of the material intermediate each pair of adjacent incisions, bonding a layer of flexible material to the board surface so ribbed, and removing said connecting board material so as to form slightly spaced laths bonded to said flexible layer.

4. A method of producing composite panels comprising the steps of providing a board with a plurality of substantially parallel incisions so as to leave connecting board material between the material intermediate each pair of adjacent incisions and the material intermediate other pairs of adjacent incisions, bonding a layer of flexible material to one surface of said board where said incisions are provided, and incising said connecting material in the planes of said first mentioned incisions, so as to form slightly spaced parallel laths bonded to said flexible surface.

5. A method of producng composite panels comprising the steps of providing a board with a plurality of parallel incisions penetrating the thickness of the board and leaving portions of the board at the ends of the incisions non-incised, which portions extend substantially in a direction transverse to that of said incisions, bonding a layer of flexible material to at least one of the incised board surfaces, and removing said non-incised board portions.

6. A method of producing composite panels comprising the steps of providing a board with a plurality of substantially parallel incisions so as to leave connecting board material between the material intermediate each pair of adjacent incisions and the material intermediate other pairs of adjacent incisions, bonding a layer of flexible material to at least one surface of said board where said incisions are provided, dividing the so obtained structure by cutting through said board in a plane parallel to said layer, the said connecting material being removed so as to form slightly spaced parallel laths bonded to said flexible layer.

7. A method of producing composite panels comprising the steps of providing one surface of a board with a plurality of incisions of a depth somewhat less than the thickness of the board, bonding a layer of flexible material to said surface so incised, cutting said board in a plane parallel to said surface so as to obtain a composite panel and a board of reduced thickness and incised in one of its surfaces, bonding another layer of flexible material to the incised surface of said last mentioned board, and removing material of its opposite surface so as to expose the incisions.

8. A method of producing composite panels comprising the steps of providing a board on either surface with a set of parallel incisions of a depth smaller than the thickness of the board, the incisions of the one set alternating with and overlapping the incisions of the other set, bonding a flexible sheet to either surface of the board so incised, and dividing the so obtained structure in two composite panels by cutting it in a plane parallel to said surfaces.

HENDRIKUS F. WAARDS.

REFERENCES CITED

The following references are of record in the file of this patent:

UNITED STATES PATENTS

| Number | Name | Date |
|---|---|---|
| 1,459,499 | Brown | June 19, 1923 |
| 2,018,712 | Elmendorf | Oct. 29, 1935 |
| 2,397,415 | Ghez | Mar. 26, 1946 |

FOREIGN PATENTS

| Number | Country | Date |
|---|---|---|
| 377,135 | Great Britain | July 21, 1932 |
| 801,433 | France | Aug. 4, 1936 |
| 57,975 | Netherlands | Aug. 15, 1946 |
| 116,279 | Sweden | Feb. 21, 1946 |